United States Patent
Yokoyama et al.

(10) Patent No.: US 9,144,923 B2
(45) Date of Patent: Sep. 29, 2015

(54) PORTABLE CUTTING MACHINE

(71) Applicant: HITACHI KOKI CO., LTD, Tokyo (JP)

(72) Inventors: Yoshikazu Yokoyama, Hitachinaka (JP); Yasuoki Kawahata, Hitachinaka (JP)

(73) Assignee: HITACHI KOKI CO., LTD., Tokyo (JP)

( * ) Notice: Subject to any disclaimer, the term of this patent is extended or adjusted under 35 U.S.C. 154(b) by 189 days.

(21) Appl. No.: 13/745,345

(22) Filed: Jan. 18, 2013

(65) Prior Publication Data

US 2013/0180116 A1 Jul. 18, 2013

(30) Foreign Application Priority Data

Jan. 18, 2012 (JP) ................................ 2012-007769

(51) Int. Cl.
*B28D 1/04* (2006.01)
*B28D 1/22* (2006.01)
*B23D 45/16* (2006.01)
*B23D 47/02* (2006.01)

(52) U.S. Cl.
CPC ................ *B28D 1/228* (2013.01); *B23D 45/16* (2013.01); *B23D 47/02* (2013.01); *B28D 1/045* (2013.01)

(58) Field of Classification Search
CPC ........ B23D 45/16; B23D 47/02; B28D 1/045; B28D 1/228
USPC .......... 30/371, 388, 390; 125/13.01; 451/358, 451/359
See application file for complete search history.

(56) References Cited

U.S. PATENT DOCUMENTS

| 1,917,906 | A | * | 7/1933 | Schulte .......................... 451/358 |
| 2,069,700 | A | * | 2/1937 | Emmons ....................... 451/358 |
| 2,815,050 | A | * | 12/1957 | Haug .............................. 30/388 |
| 3,515,357 | A | * | 6/1970 | Clark .......................... 241/101.2 |
| 3,623,523 | A | * | 11/1971 | Meyer et al. ..................... 99/503 |
| 4,188,935 | A | * | 2/1980 | Tubesing ................... 125/13.01 |
| 4,620,367 | A | * | 11/1986 | Tubesing et al. ................ 30/122 |
| 4,962,617 | A | | 10/1990 | Tilders et al. |
| 5,305,729 | A | * | 4/1994 | Chiuminatta et al. .......... 125/12 |
| 6,568,088 | B1 | * | 5/2003 | Ende ................................. 30/371 |
| 7,144,311 | B2 | * | 12/2006 | Jaensch ......................... 451/358 |
| 7,520,276 | B2 | * | 4/2009 | Jakobsson et al. ......... 125/13.01 |
| 8,272,134 | B2 | * | 9/2012 | Soika et al. ..................... 30/390 |

(Continued)

FOREIGN PATENT DOCUMENTS

| DE | 20 2013 100 248 U1 | * | 5/2013 |
| DE | 10 2012 218 040 A1 | * | 4/2014 |
| JP | 2984318 B2 | | 11/1999 |

*Primary Examiner* — Hwei C Payer
(74) *Attorney, Agent, or Firm* — McDermott Will & Emery LLP (57) ABSTRACT

Front feet are provided at a lower part of a cutting-machine main body via a foot holder. Furthermore, a slider positioned on a front side relative to the front feet is provided at the lower part. When a workpiece to be cut is to be cut by a blade, the cutting-machine main body is tilted so as to let the blade go down. When the cutting-machine main body is tilted, a state where the front feet are in contact with the workpiece is switched to a state where the slider is in contact with the workpiece. Then, by moving the cutting-machine main body forward while sliding the slider on the workpiece, the workpiece is cut by the blade. In the cutting operation, the front feet can get away from the workpiece. Therefore, damage of the front feet can be prevented, and the running cost can be suppressed.

7 Claims, 9 Drawing Sheets

(56) References Cited

U.S. PATENT DOCUMENTS

| | | | |
|---|---|---|---|
| 8,683,706 B2* | 4/2014 | Okumi et al. | 30/388 |
| 8,739,418 B2* | 6/2014 | Okumi et al. | 30/390 |
| 2002/0066190 A1* | 6/2002 | Fey et al. | 30/371 |
| 2009/0236900 A1* | 9/2009 | Due et al. | 299/39.3 |
| 2013/0180116 A1* | 7/2013 | Yokoyama et al. | 30/275.4 |
| 2013/0247896 A1* | 9/2013 | Andersson et al. | 125/13.01 |

\* cited by examiner

PORTABLE CUTTING MACHINE

CROSS-REFERENCE TO RELATED APPLICATION

The present application claims priority from Japanese Patent Application No. 2012-007769 filed on Jan. 18, 2012, the content of which is hereby incorporated by reference into this application.

TECHNICAL FIELD OF THE INVENTION

The present invention relates to a portable cutting machine provided with a blade which is rotary-driven by an engine.

BACKGROUND OF THE INVENTION

Portable cutting machines for carrying out marking or cutting operations for concrete, asphalt, stone materials, and others include, for example, an engine cutter. The portable cutting machine also referred to as a hand cutting machine has a cutting-machine main body in which an engine serving as a drive source is mounted, a blade to be rotary-driven by the engine is provided on a front side of the cutting-machine main body, and a rear handle to be gripped by an operator is provided on a rear side of the cutting-machine main body. Furthermore, foot members to be in contact with a workpiece to be cut such as concrete are provided at a lower part of the cutting-machine main body (see Japanese Patent No. 2984318). For example, when concrete is to be cut, after the engine cutter is set on the concrete and the engine is started, the rear handle is pulled up by the operator. As a result, the engine cutter is tilted on a pivot point corresponding to the foot members in contact with the concrete, so that the rotating blade is lowered and cutting into the concrete is started. Then, after the rear handle is pulled up until the blade reaches a desired cutting depth, the portable cutting machine is pushed forward while sliding the foot members, thereby cutting the concrete while the portable cutting machine is moving forward.

SUMMARY OF THE INVENTION

Meanwhile, in order to prevent unintended movement of the portable cutting machine due to engine vibrations when the portable cutting machine is placed on the workpiece to be cut, the foot members to be in contact with the workpiece to be cut are required to have a function of attenuating the engine vibrations. In order to impart such an attenuation function to the foot members, the foot members are generally formed by using a rubber material. However, forming the foot members simply by the rubber material causes increase in the running cost of the portable cutting machine. More specifically, since the foot members slide on a workpiece to be cut such as concrete in a cutting operation, when a rubber material having inferior wear resistance is used, the replacement frequency of the foot members is increased, which has caused increase in the running cost.

An object of the present invention is to suppress the running cost of a portable cutting machine.

A portable cutting machine according to an embodiment is a portable cutting machine which has a cutting-machine main body provided with a blade to be rotary-driven by an engine and cuts a workpiece to be cut by using the blade, the portable cutting machine includes: a first contact member provided at a lower part of the cutting-machine main body; and a second contact member provided at the lower part of the cutting-machine main body, the first contact member is projecting downward relative to the second contact member, and the second contact member is provided to the cutting-machine main body in an attachable/detachable manner.

According to the present invention, the first and second contact members are provided at the lower part of the cutting-machine main body, the first contact member is projecting downward relative to the second contact member, and the second contact member is provided so as to be attachable/detachable to/from the cutting-machine main body. In this manner, when the cutting-machine main body is tilted on the workpiece to be cut in order to cut the workpiece to be cut, the member that is in contact with the workpiece to be cut can be switched from the first contact member to the second contact member. Therefore, damage on the first contact member can be prevented, and the running cost of the portable cutting machine can be suppressed. Moreover, since the second contact member is provided so as to be attachable/detachable to/from the cutting-machine main body, if the second contact member to be in contact with the workpiece to be cut is damaged, only the damaged second contact member can be replaced, and the running cost of the portable cutting machine can be suppressed.

DESCRIPTIONS OF THE PREFERRED EMBODIMENTS

Figure 1:
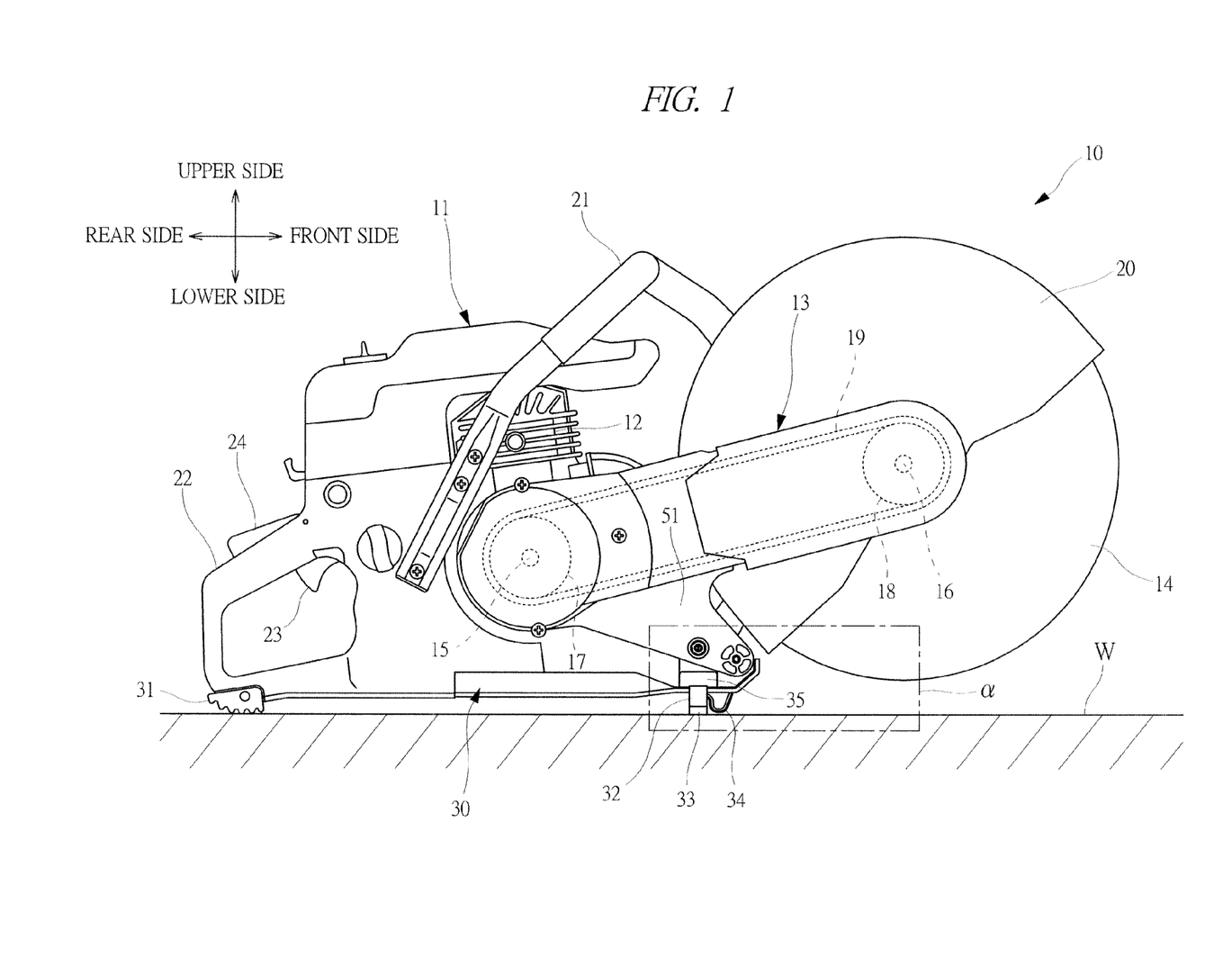
FIG. 1 is a lateral view showing an engine cutter serving as a portable cutting machine according to an embodiment of the present invention.

Hereinafter, an embodiment of the present invention will be described in detail based on drawings. FIG. 1 is a lateral view showing an engine cutter 10 serving as a portable cutting machine according to an embodiment of the present invention. As shown in FIG. 1, the engine cutter 10 has a cutting-machine main body 11, and an engine 12 serving as a drive source is mounted in the cutting-machine main body 11. A power transmitting arm 13 is attached to a crankcase (not shown) of the engine 12, and a disk-like blade 14 is attached to a distal-end part of the power transmitting arm 13. In this manner, the blade 14 is provided at one end side of the cutting-machine main body 11. Also, an output shaft 15 which is coupled to a crankshaft (not shown) via a centrifugal clutch and a rotation shaft 16 which is fixed to a center part of the blade 14 are provided to the power transmitting arm 13. A driving pulley 17 is fixed to the output shaft 15, and a driven pulley 18 is fixed to the rotation shaft 16. Furthermore, a belt 19 is wound around the driving pulley 17 and the driven pulley 18, and engine power is transmitted to the blade 14 via the belt 19. A blade cover 20 partially covering the blade 14 is attached to the power transmitting arm 13.

In the cutting-machine main body 11, a front handle 21 to be gripped by one of the hands of an operator is provided, and the front handle 21 is attached so as to bridge over the cutting-machine main body 11. Also, a rear handle 22 to be gripped by the other hand of the operator is provided at a rear-end part of the cutting-machine main body 11. Furthermore, the rear handle 22 is provided with a throttle lever 23 which adjusts the revolutions of the engine, and is provided with a lock lever 24 which cancels operation restriction of the throttle lever 23. At a lower part 30 on the rear side of the cutting-machine main body 11, a rear foot 31 made of, for example, a resin material is provided. Also, at the lower part 30 on the front side of the cutting-machine main body 11, front feet 33 which serve as first contact members are provided via a foot holder 32. Furthermore, at the lower part 30 on the front side of the cutting-machine main body 11, a slider 34 positioned on the front side (blade 14 side) relative to the front feet 33 and serving as a second contact member is provided.

Figure 2:
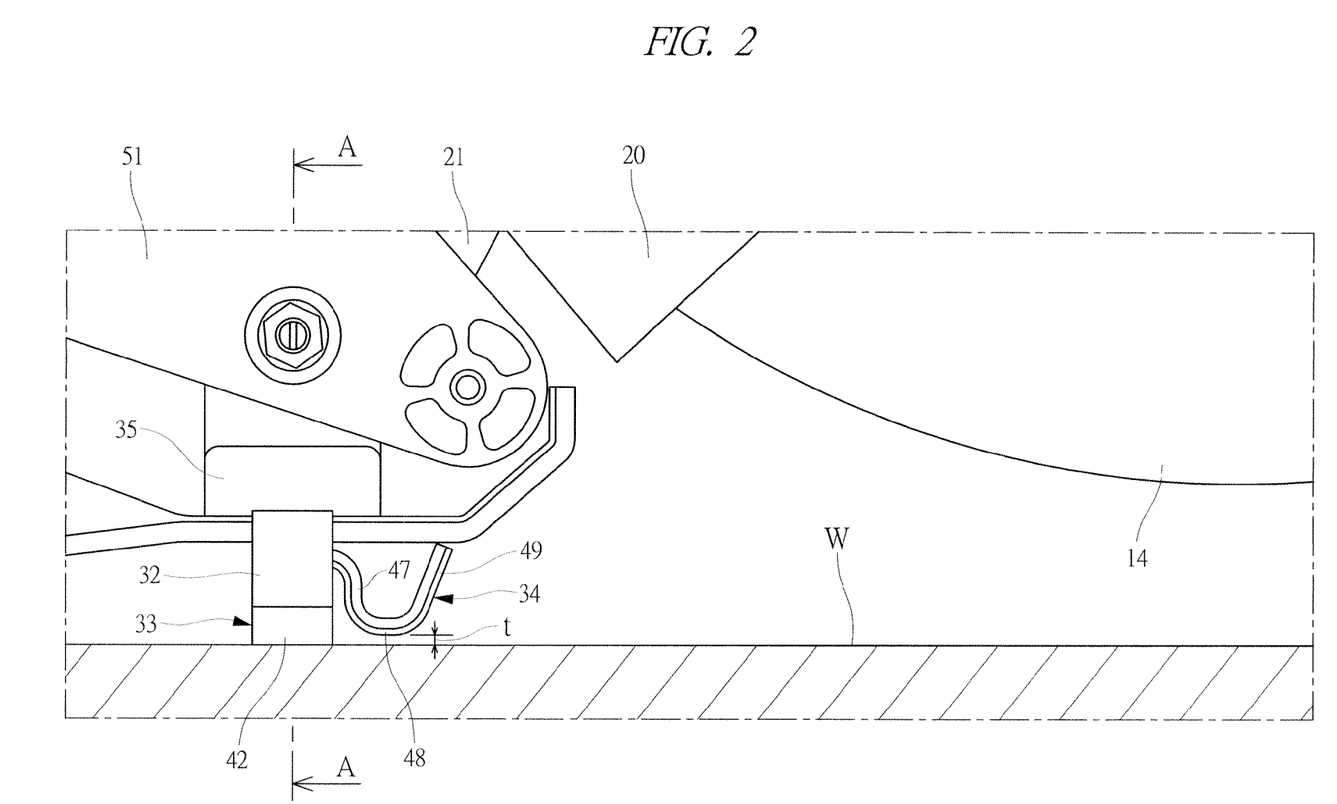
FIG. 2 is a partial enlarged view showing an area α of FIG. 1.
Figure 3:
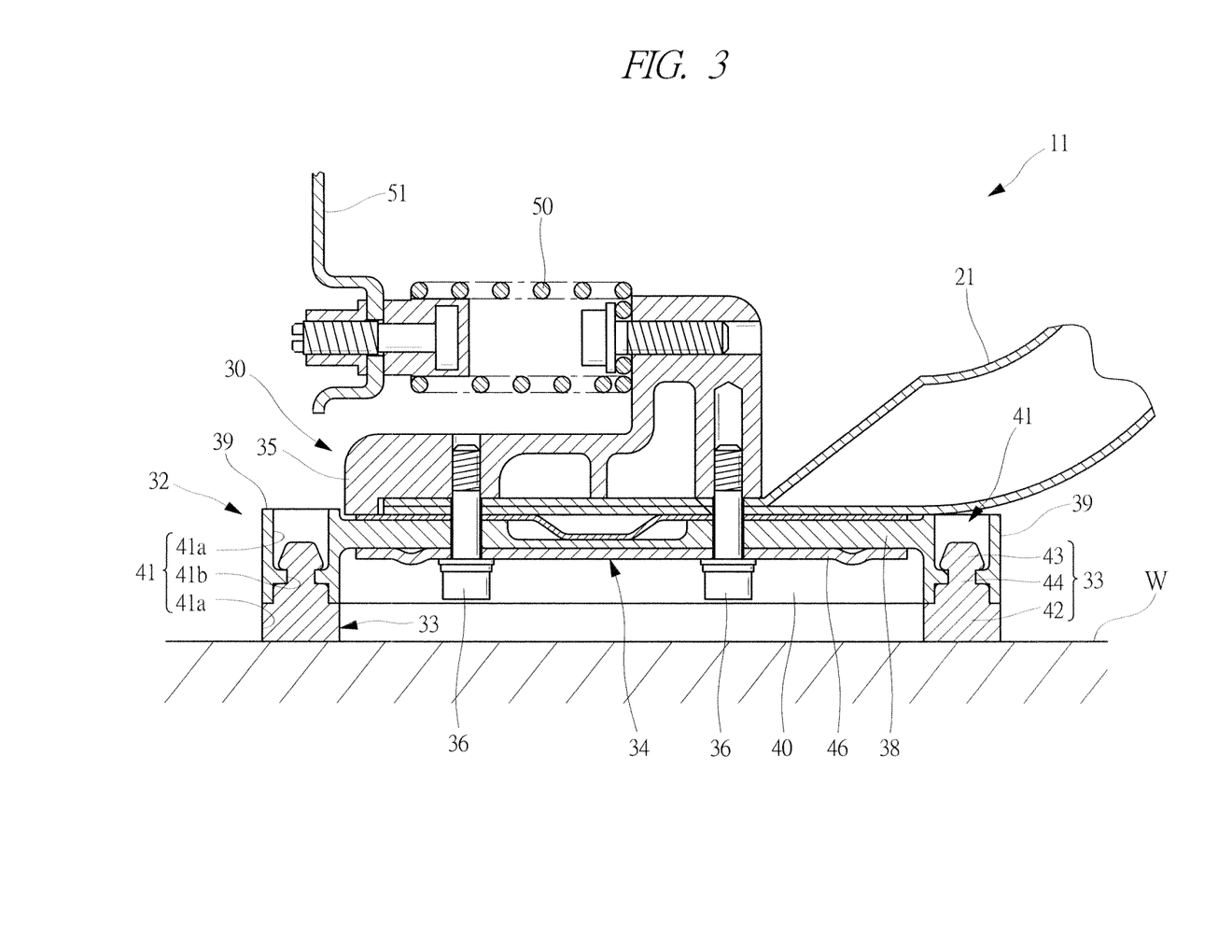
FIG. 3 is a partial cross-sectional view showing a structure of the engine cutter taken along a line A-A of FIG. 2.
Figure 4A:
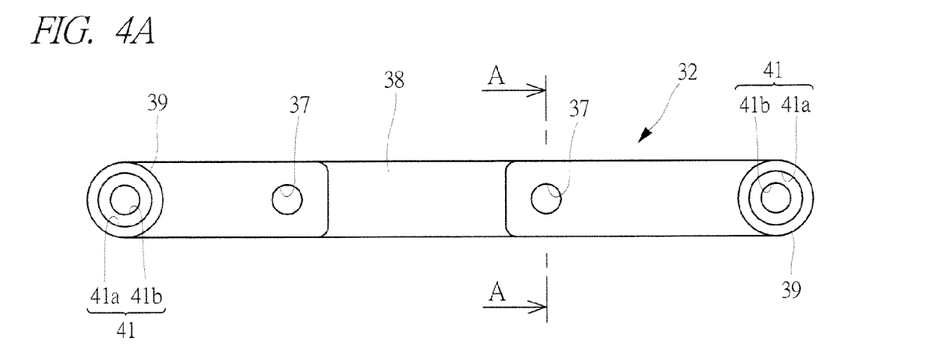
FIG. 4A is a plan view showing a foot holder.
Figure 4B:
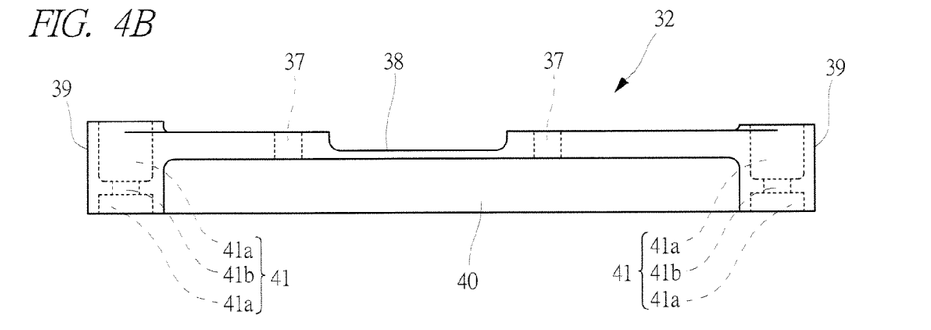
FIG. 4B is a front view showing the foot holder.
Figure 4C:
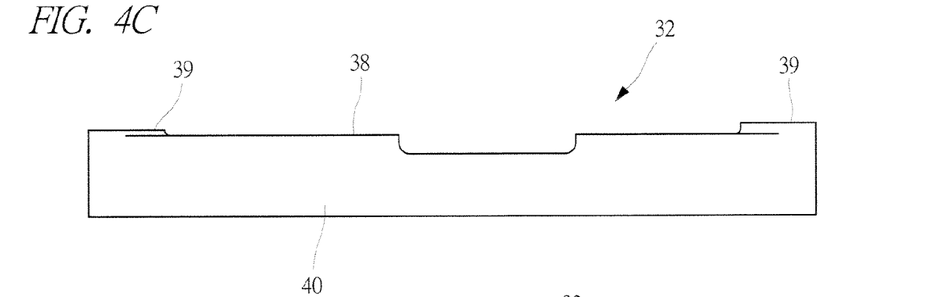
FIG. 4C is a back view showing the foot holder.
Figure 4D:
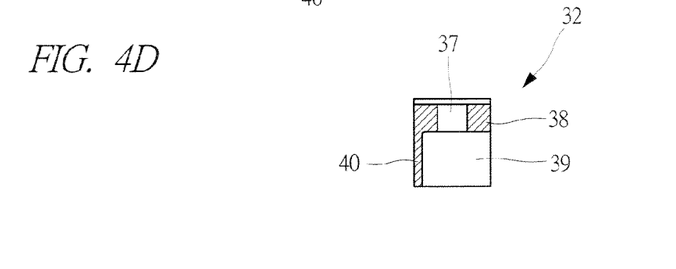
FIG. 4D is a cross-sectional view showing the foot holder taken along a line A-A of FIG. 4A.
Figure 5A:
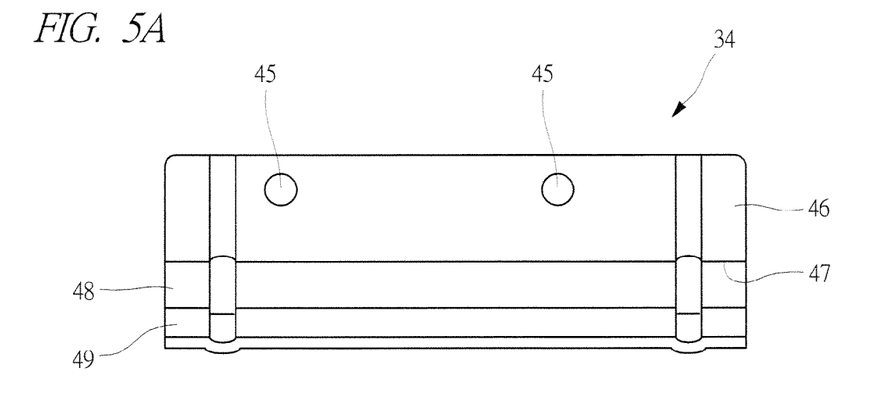
FIG. 5A is a plan view showing a slider.
Figure 5B:
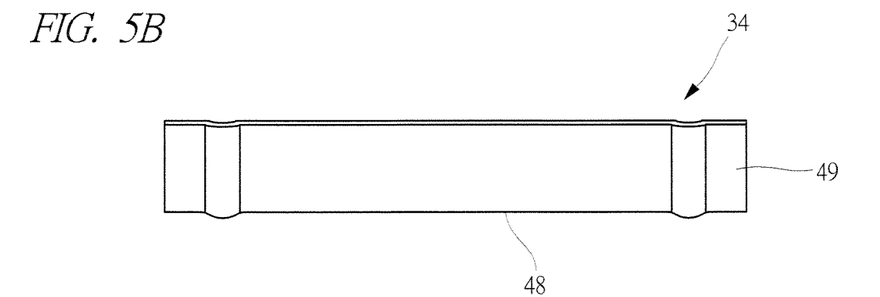
FIG. 5B is a front view showing the slider.
Figure 5C:
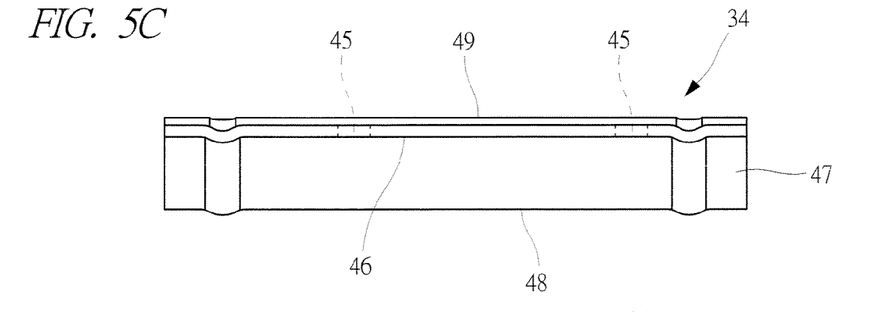
FIG. 5C is a back view showing the slider.
Figure 5D:
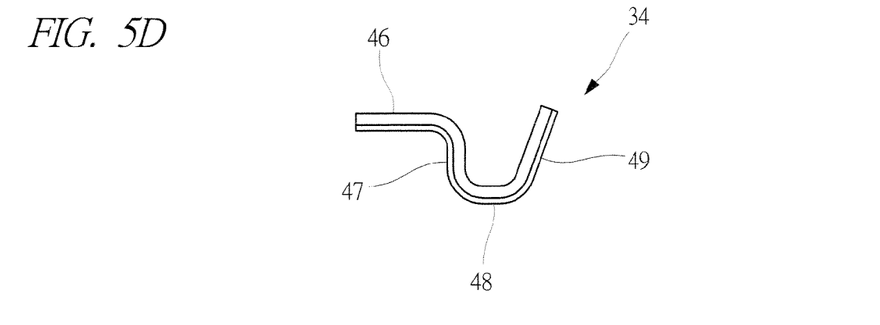
FIG. 5D is a left lateral view showing the slider.

FIG. 2 is a partial enlarged view showing an area α of FIG. 1. FIG. 3 is a partial cross-sectional view showing a structure of the engine cutter 10 taken along a line A-A of FIG. 2. FIGS. 4A to 4C are a plan view, a front view, and a back view showing the foot holder 32, and FIG. 4D is a cross-sectional view showing the foot holder 32 taken along a line A-A of FIG. 4A. Also, FIGS. 5A to 5D are a plan view, a front view, a back view, and a left lateral view showing the slider 34. Furthermore, FIG. 6A is an exploded perspective view showing the foot holder 32, the front feet 33, and the slider 34, and FIG. 6B is a perspective view showing an assembled state of the foot holder 32, the front feet 33, and the slider 34.

As shown in FIG. 2 and FIG. 3, the foot holder 32 and the slider 34 are fixed to a block 35, which constitutes the lower part 30 of the cutting-machine main body 11, by using fastening bolts 36. In other words, the foot holder 32 and the slider 34 are provided at the lower part 30 of the cutting-machine main body 11 in an attachable/detachable manner. Also, as shown in FIG. 4 and FIG. 6, the foot holder 32 made of, for example, a resin material is composed of a plate-like base part 38 having two bolt holes 37, cylindrical holder parts 39 extending downward from both ends of the base part 38, and a wall part 40 integrally connecting the base part 38 and the holder part 39. In each of the holder parts 39, an attachment hole 41 having a large-diameter hole part 41a and a small-diameter hole part 41b is formed so as to fix the front foot 33. As shown in FIG. 3 and FIG. 6, the front foot 33 made of, for example, a rubber material is composed of a columnar leg part 42, a tapered head part 43, and a narrowed part 44 coupling the leg part 42 and the head part 43. By inserting the head part 43 of the front foot 33 into the attachment hole 41 of the foot holder 32 while elastically deforming the head part 43, the front foot 33 can be fixed to the foot holder 32. Also, as shown in FIG. 5 and FIG. 6, the slider 34 which is also referred to as a guide is formed by, for example, subjecting a metal plate to pressing. The slider 34 is composed of a base plate part 46 having two bolt holes 45, a perpendicular plate part 47 extending at an approximately right angle from the base plate part 46, a horizontal plate part 48 extending at an approximately right angle from the perpendicular plate part 47, and a slanted plate part 49 extending upward at a predetermined angle from the horizontal plate part 48.

Figure 6A:
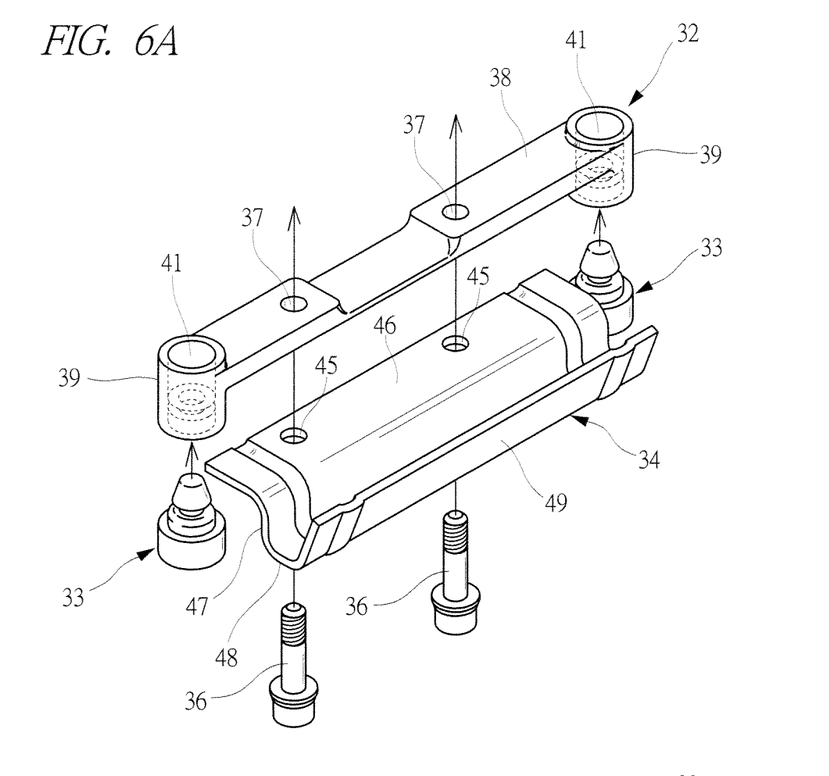
FIG. 6A is an exploded perspective view showing the foot holder, front feet, and the slider.
Figure 6B:
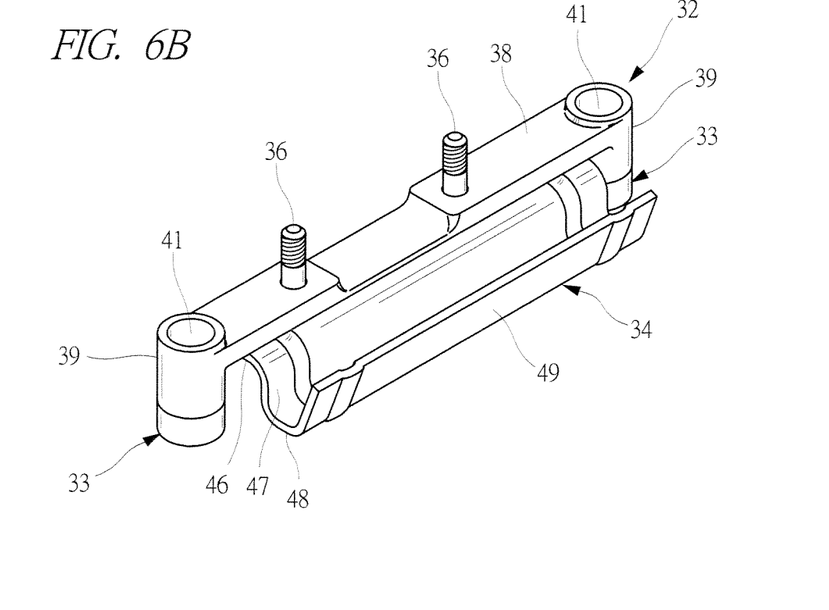
FIG. 6B is a perspective view showing an assembled state of the foot holder, the front feet, and the slider.

As shown in FIG. 2, FIG. 3, and FIG. 6, the foot holder 32 and the slider 34 are fixed to the block 35 of the cutting-machine main body 11 and the front feet 33 are fixed to the foot holder 32, thereby achieving the state in which the slider 34 is disposed between a pair of front feet 33. Also, as shown in FIG. 2, the leg parts 42 which are lower end parts of the front feet 33 are projecting downward relative to the horizontal plate part 48 serving as a lower end part of the slider 34. Note that the "downward" means the direction of the gravitational force that acts on the engine cutter 10 when the engine cutter 10 is placed on a horizontal surface plate. Therefore, when the engine cutter 10 is set on a workpiece to be cut W such as concrete, asphalt, or stone material, a predetermined gap t is provided between the workpiece to be cut W and the slider 34. In other words, in the case shown in the drawings, the dimensions of the front feet 33 and the slider 34 are set so that the gap t is provided between the workpiece to be cut W and the slider 34 in consideration of flexure of the front feet 33 caused by the own weight of the engine cutter 10. Also, the horizontal plate part 48 of the slider 34 is disposed on a front side (blade 14 side) relative to the leg parts 42 of the front feet 33. The front feet 33 are made of a rubber material which is an elastic material having a longitudinal elastic modulus (Young's modulus) of 200 MPa or less, and the slider 34 is made of a metal material having a longitudinal elastic modulus of more than 200 MPa. More specifically, the front feet 33 are made of a material softer than the slider 34, and the front feet 33 are formed to be softer than the slider 34.

As shown in FIG. 3, the front handle 21 is fixed to the block 35 of the cutting-machine main body 11 by using the fastening bolts 36, and a stay 51 is coupled to the block 35 via a coil spring 50. Moreover, as shown in FIG. 1, the stay 51 coupled to the block 35 is fixed to the power transmitting arm 13 on the engine 12 side. In other words, the engine 12 is coupled to the front handle 21 and the rear handle 22 via the coil spring 50 to form a structure which suppresses transmission of engine vibrations to the front handle 21 and the rear handle 22.

Figure 7:
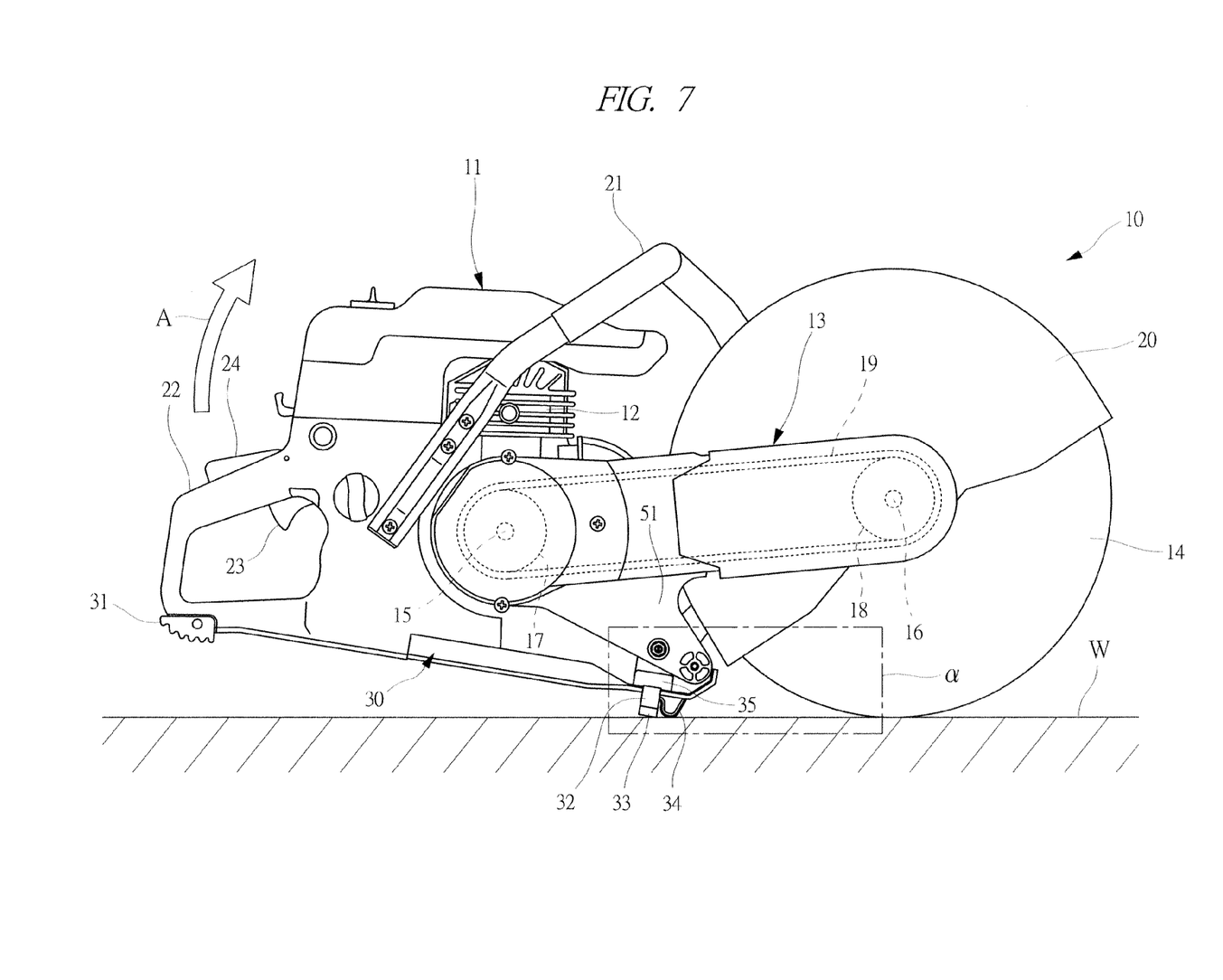
FIG. 7 is an explanatory drawing showing a cutting procedure by the engine cutter.
Figure 8:
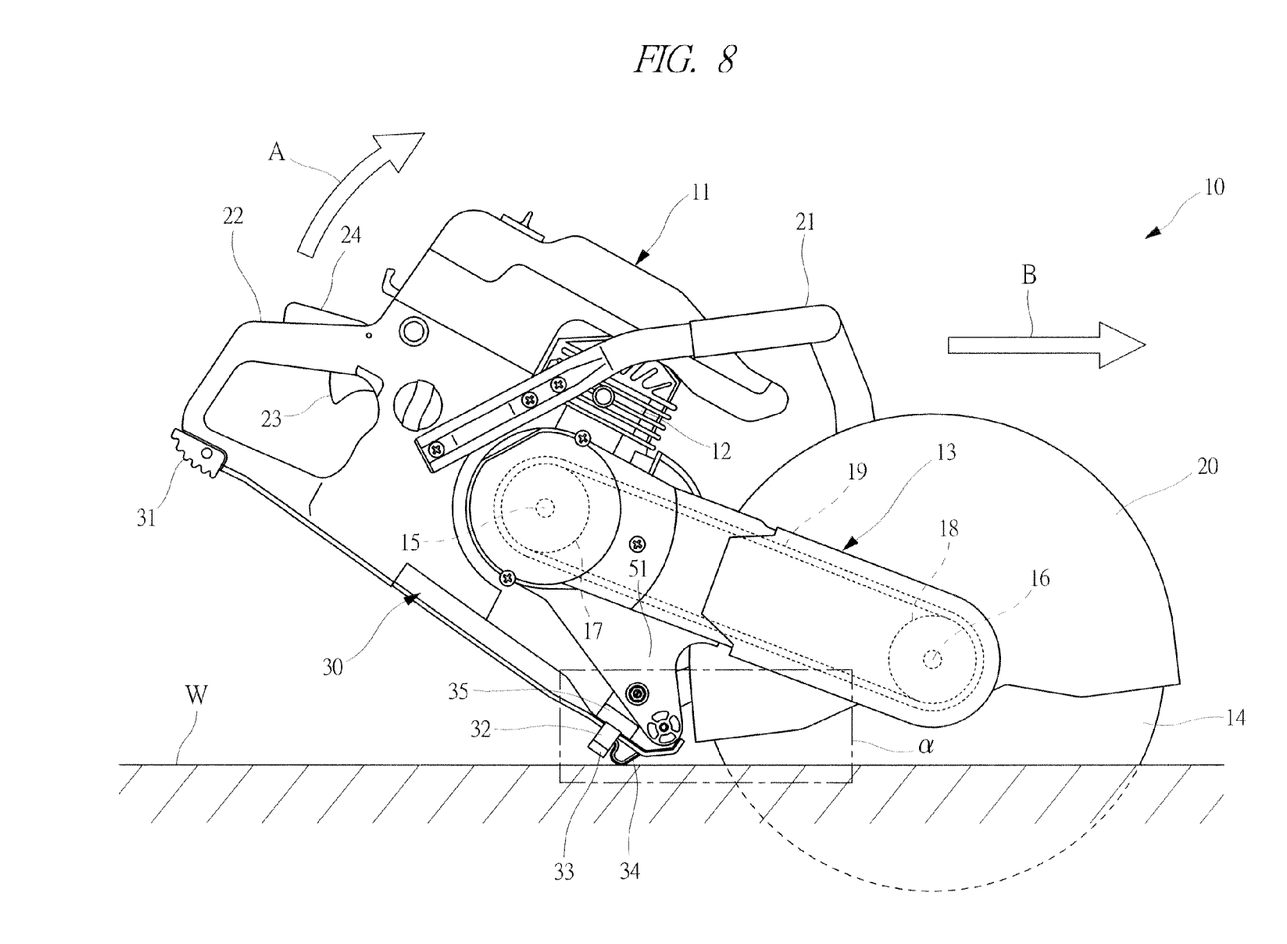
FIG. 8 is an explanatory drawing showing the cutting procedure by the engine cutter.
Figure 9A:
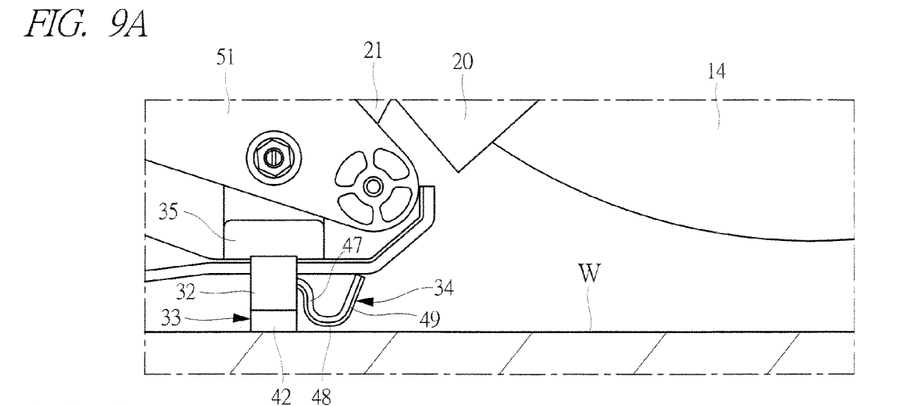
FIG. 9A is a partial enlarged view showing the front feet and the slider in a cutting operation.
Figure 9B:
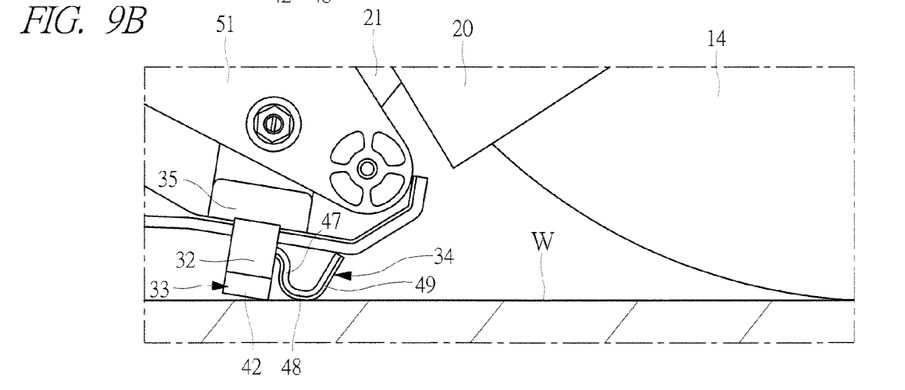
FIG. 9B is a partial enlarged view showing the front feet and the slider in the cutting operation.
Figure 9C:
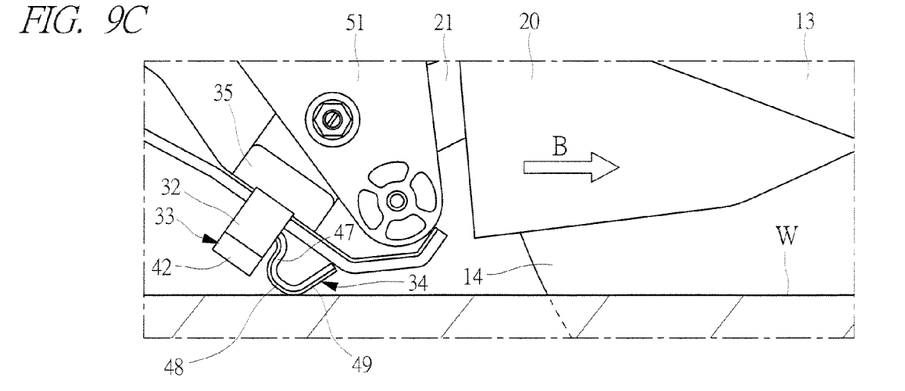
FIG. 9C is a partial enlarged view showing the front feet and the slider in the cutting operation.

Subsequently, a procedure of cutting the workpiece to be cut W by the engine cutter 10 will be described. FIG. 7 and FIG. 8 are explanatory drawings showing the cutting procedure by the engine cutter 10. Also, FIGS. 9A to 9C are partial enlarged views showing the front foot 33 and the slider 34 during the cutting operation. FIG. 9A shows the area α of FIG. 1, FIG. 9B shows the area α of FIG. 7, and FIG. 9C shows the area α of FIG. 8.

As shown in FIG. 1, when the workpiece to be cut W such as concrete, asphalt, or stone material is to be cut, the cutting-machine main body 11 (engine cutter 10) is first placed on the workpiece to be cut W. At this time, as shown in FIG. 9A, while the leg parts 42 of the front feet 33 are in contact with the workpiece to be cut W, the horizontal plate part 48 of the slider 34 is away from the workpiece to be cut W. Then, after the engine 12 is started by the operator, the operator grips the front handle 21 and the rear handle 22 and pulls up the rear-end part of the cutting-machine main body 11 upward as shown by an arrow A in FIG. 7 while manipulating the throttle lever 23 to rotate the blade 14. As a result, as shown in FIG. 7 and FIG. 9B, the cutting-machine main body 11 is tilted on a pivot point corresponding to the front feet 33 in contact with the workpiece to be cut W, so that the blade 14 positioned in the front-end part of the cutting-machine main body 11 starts cutting of the workpiece to be cut W while going downward. Then, as shown by an arrow A in FIG. 8, the rear-end part of the cutting-machine main body 11 is pulled up until the blade 14 reaches a desired cutting depth. In this manner, when the rear-end part of the cutting-machine main body 11 is pulled up, as shown in FIG. 8 and FIG. 9C, the horizontal plate part 48 of the slider 34 positioned on the front side relative to the front feet 33 is brought into contact with the workpiece to be cut W, and the leg parts 42 of the front feet 33 are away from the workpiece to be cut W. Subsequently, the operator manipulates the cutting-machine main body 11 so as to push it forward as shown by an arrow B in FIG. 8 and FIG. 9C while gripping the front handle 21 and the rear handle 22. As a result, the cutting-machine main body 11 can be moved to the front side while sliding the slider 34 on the workpiece to be cut W, and the workpiece to be cut W can be cut by the blade 14. Note that, depending on the degree of tilt of the cutting-machine main body 11, the slanted plate part 49 of the slider 34 is brought into contact with the workpiece to be cut W.

In this manner, since the slider 34 is provided on the front side relative to the front feet 33 and the front feet 33 are formed to project downward relative to the slider 34, when the cutting-machine main body 11 is set on the workpiece to be cut W, the front feet 33 can be brought into contact with the workpiece to be cut W. Accordingly, even when the engine 12 is started in the state in which the cutting-machine main body 11 is set on the workpiece to be cut W, engine vibrations can be attenuated by the front feet 33 made of an elastic material, and unintended movement of the engine cutter 10 due to the engine vibrations in an idling state can be prevented. Then, when the cutting-machine main body 11 is tilted on the workpiece to be cut W, the slider 34 can be brought into contact with the workpiece to be cut W instead of the front feet 33. More specifically, when the cutting-machine main body 11 is slid and moved forward, the front feet 33 are away from the workpiece to be cut W, while the slider 34 made of a metal material is in contact with the workpiece to be cut W. Therefore, even when the front feet 33 made of an elastic material are employed from the viewpoint of enhancing the attenuation performance, the front feet 33 are prevented from being rubbed and damaged by the workpiece to be cut W, and durability of the front feet 33 can be significantly improved. Thus, the replacement frequency of the front feet 33 can be reduced, and the running cost of the engine cutter 10 can be therefore suppressed.

Also, as shown in FIG. 6A, the engine cutter 10 has the structure in which the front feet 33 can be fixed to the foot holder 32 only by inserting the front feet 33 into the attachment holes 41 of the foot holder 32. In other words, since the front feet 33 can be attached/detached without using any tool, the front feet 33 can be easily replaced. Furthermore, since the slider 34 is also provided to the cutting-machine main body 11 in an attachable/detachable manner as shown in FIG. 6A, even when the slider 34 is worn along with usage, only the worn slider 34 can be replaced. Therefore, the running cost of the engine cutter 10 can be suppressed.

As shown in FIG. 9, in the descriptions above, the member that is in contact with the workpiece to be cut W is switched from the front feet 33 to the slider 34 at the time when the blade 14 is brought into contact with the workpiece to be cut W, but the switching is not limited to this. For example, the member that is in contact with the workpiece to be cut W may be switched from the front feet 33 to the slider 34 at the time when the cutting depth of the blade 14 with respect to the workpiece to be cut W reaches a predetermined depth, or the member that is in contact with the workpiece to be cut W may be switched from the front feet 33 to the slider 34 at the time before the blade 14 is brought into contact with the workpiece to be cut W. Alternatively, in the process of switching the member that is in contact with the workpiece to be cut W from the front feet 33 to the slider 34, both of the front feet 33 and the slider 34 may be in contact with the workpiece to be cut W at the same time.

In the case shown in FIG. 2, the gap t is provided between the workpiece to be cut W and the slider 34, but is not limited to this. As long as the front feet 33 mainly support the own weight of the engine cutter 10, in other words, if larger load acts on the front feet 33 compared with that on the slider 34, not only the front feet 33 but the slider 34 may be in contact with the workpiece to be cut W. Also in this case, if the engine cutter 10 is lifted up to eliminate the load that acts on the front feet 33, the leg parts 42 of the front feet 33 are projecting downward relative to the horizontal plate part 48 of the slider 34.

In the descriptions above, the front feet 33 are made of an elastic material such as a rubber material, and the slider 34 is made of a metal material such as an iron plate. However, the materials are not limited to these. As long as the vibration attenuation characteristics required for the front feet 33 and the wear resistance required for the slider 34 can be satisfied, other materials such as resin materials may be used to form the front feet 33 and the slider 34. Furthermore, the front feet 33 are not limited to be softer in terms of material than the slider 34, and as long as the front feet 33 are formed to be structurally softer than the slider 34, the front feet 33 and the slider 34 may be made of the same material. Moreover, in the descriptions above, the slider 34 that is brought into sliding contact with the workpiece to be cut W is mentioned as the second contact member, but the member is not limited to this, and a wheel that is brought into rolling contact with the workpiece to be cut W may be used as the second contact member.

The present invention is not limited to the above-described embodiment, and it goes without saying that various modifications can be made without departing from the scope thereof. For example, the front feet 33 are fixed to the foot holder 32 in the case shown in the drawings, but are not limited to be fixed thereto, and in order to suppress further transmission of the engine vibrations, a spring may be incorporated between the front feet 33 and the foot holder 32. The engine 12 mounted on the engine cutter 10 may be a four-stroke engine or may be a two-stroke engine.

What is claimed is:

1. A portable cutting machine which has a cutting-machine main body provided with a blade to be rotary-driven by an engine and cuts a workpiece to be cut by using the blade, the portable cutting machine comprising:

a pair of first contact members provided at a lower part of the cutting-machine main body; and a second contact member provided at the lower part of the cutting-machine main body and extending between the pair of first contact members, wherein the first contact members project downward relative to the second contact member, the second contact member is provided to the cutting-machine main body in an attachable/detachable manner, the second contact member is replaceable independently of the first contact members, and the second contact member is a metal plate, and a holder is provided to the cutting-machine main body in an attachable/detachable manner, wherein the holder comprises two opposite ends, each of the first contact members is coupled to a respective one of the opposite ends of the holder, and the second contact member is coupled to the holder and is disposed between the first contact members in an attachable/detachable manner.

2. The portable cutting machine according to claim 1, wherein the first contact members are made of an elastic material.

3. The portable cutting machine according to claim 1, wherein, when the cutting-machine main body is placed on the workpiece to be cut, the first contact members are in contact with the workpiece to be cut, and when the cutting-machine main body on the workpiece to be cut is tilted on a pivot point corresponding to the first contact members, the second contact member is in contact with the workpiece to be cut.

4. The portable cutting machine according to claim 3, wherein, when the cutting-machine main body on the workpiece to be cut is tilted on the pivot point corresponding to the first contact members, the first contact members get away from the workpiece to be cut.

5. The portable cutting machine according to claim 1, wherein the first contact members are made of a material softer than the second contact member.

6. The portable cutting machine according to claim 1, wherein the first contact members are provided to the holder in an attachable/detachable manner.

7. A portable cutting machine which has a cutting-machine main body provided with a blade to be rotary-driven by an engine and cuts a workpiece to be cut by using the blade, the portable cutting machine comprising:

a pair of first contact members provided at a lower part of the cutting-machine main body; and a second contact member provided at the lower part of the cutting-machine main body and extending between the pair of first contact members, wherein the first contact members project downward relative to the second contact member, the first contact members are made of a material softer than the second contact member, and the second contact member is a metal plate, and a holder is provided to the cutting-machine main body in an attachable/detachable manner, wherein the holder comprises two opposite ends, each of the first contact members is coupled to a respective one of the opposite ends of the holder, and the second contact member is coupled to the holder and is disposed between the first contact members in an attachable/detachable manner.

* * * * *